Feb. 28, 1967 W. G. REDMOND, JR 3,307,095
MOISTURE CONTROLLED MOTOR SYSTEM FOR CLOSING
AUTOMOBILE WINDOWS AND TOPS
Filed Sept. 9, 1963 2 Sheets-Sheet 2

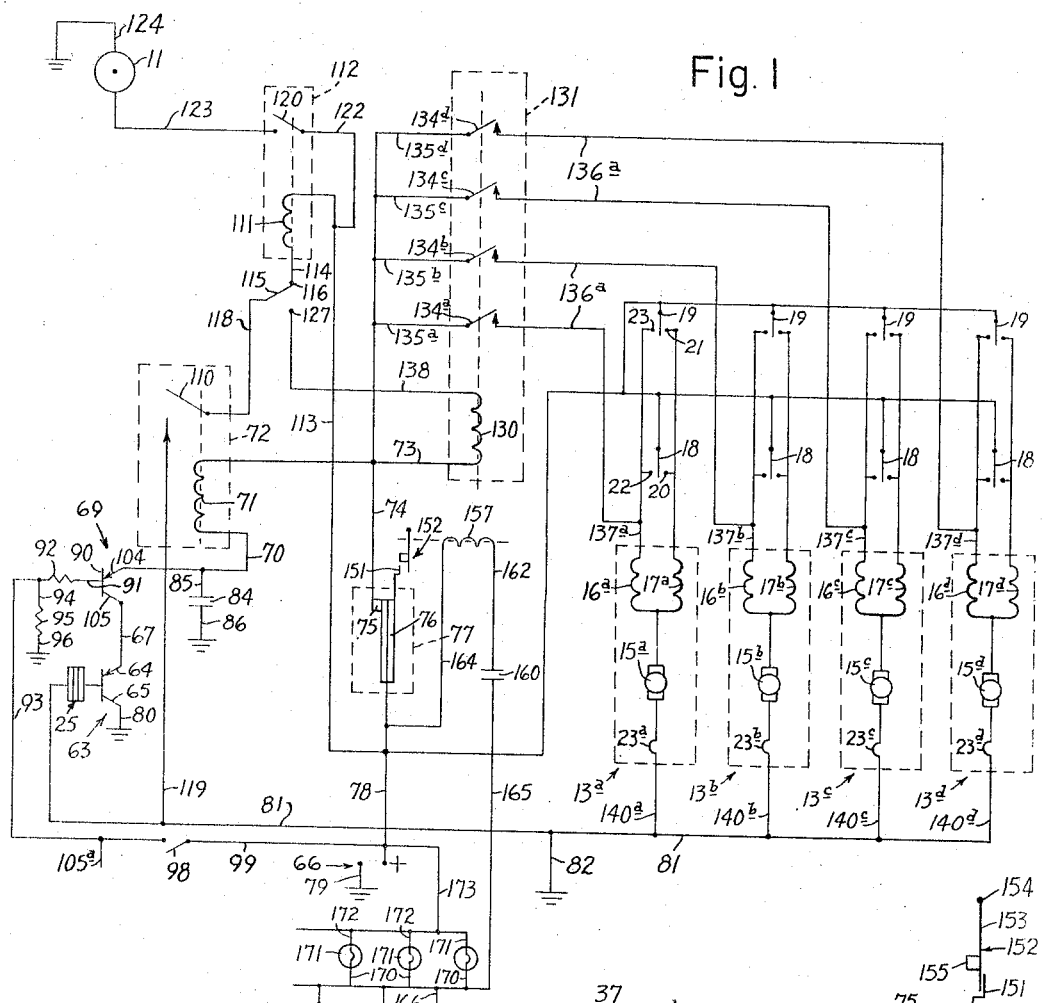

INVENTOR.
WILLIAM G. REDMOND, JR.
BY E Hastings Ackley
and
Walter J. Jagmin

United States Patent Office 3,307,095
Patented Feb. 28, 1967

3,307,095
MOISTURE CONTROLLED MOTORS SYSTEM FOR CLOSING AUTOMOBILE WINDOWS AND TOPS
William G. Redmond, Jr., 2517 Plaza, Arlington, Tex. 76010
Filed Sept. 9, 1963, Ser. No. 307,548
12 Claims. (Cl. 318—483)

This invention relates to control means and more particularly to a control means for raising vehicle tops and windows upon the occurrence of precipitation and to a sensor device for detecting precipitation.

An object of this invention is to provide a new and improved electric control means or circuit for automatically closing any open windows of a vehicle, such as an automobile, upon the occurrence of precipitation wherein all operative elements of the system are de-energized when all windows are closed.

Still another object is to provide a control circuit for automatically closing any open windows of a vehicle which includes a timer switch for de-energizing a plurality of electrically energized drive means of the windows after all the drive means have been simultaneously energized for a predetermined period of time sufficiently long to raise any one of the windows from its fully open position to its fully closed position.

A further object is to provide a precipitation sensor device for a control means of the type described which is mountable inconspicuously in any suitable upwardly opening recess or slot of a vehicle and whose resistance decreases upon the occurrence of precipitation.

A still further object is to provide a sensor device having a top surface on which precipitation falls and having no recesses or cavities in which the precipitation may accumulate.

Another object of the invention is to provide a precipitation sensor device comprising several thin planar strips of conductive substance, such as stainless steel, separated by a thin film or layer of an electrically non-conductive substance wherein the top edge surfaces of the three strips lie in a single plane whereby the precipitation easily dries off the surface upon the cessation of precipitation and any deposits are easily cleaned off such narrow top surfaces of the sensor device.

Still another object is to provide a control circuit for automatically closing windows of a vehicle wherein the timer switch is latched in its open position under the completion of a cycle of operation of the control circuit to render the control circuit inoperative and de-energize all operative elements thereof.

Still another object is to provide a control circuit wherein the timer switch is automatically reset or closed, after having been latched in its open position, when any door of the vehicle is opened thereafter.

An object of the invention is to provide a new and improved control circuit which upon the occurrence of precipitation causes the top of a convertible automobile to be moved to its closed or raised position, and then causes the windows of such convertible automobile to be raised to their closed positions.

Still another object is to provide a control circuit having means for preventing operation of the drive means of the top when the engine of the convertible automobile is operating.

Still another object is to provide a control circuit of the type described which is easily and quickly connectable to the conventional drive means of the top and window raising mechanisms of an automobile.

A further object is to provide a precipitation sensor device which is durable and easily cleaned and which provides for minimum retention of precipitation thereon.

Additional objects and advantages of the invention will be readily apparent from the reading of the following description of a device constructed in accordance with the invention, and reference to the accompanying drawings thereof, wherein:

FIGURE 1 is a diagrammatic illustration of a control circuit for raising the top and windows of a convertible automobile upon the occurrence of precipitation;

FIGURE 2 is a fragmentary schematic view of a timer switch of the control circuit latched in its open position;

FIGURE 3 is a perspective view of the sensor device embodying the invention, the thickness of the insulation and conductive strips being exaggerated;

FIGURE 4 is a vertical sectional view of the sensor device;

Figure 5:
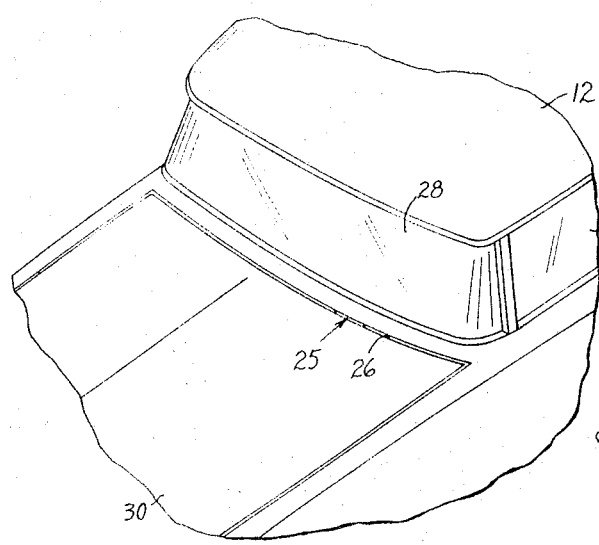
FIGURE 5 is a fragmentary perspective view of an automobile showing the moisture detecting device in position in an upwardly opened recess of the automobile between its hood and its body.

Referring now particularly to FIGURES 1 through 6 of the drawing, the control circuit is shown installed for use in a convertible automobile which has the usual motor 11 connected by a suitable mechanical linkage or transmission to the top of the automobile for raising the top to its closed position and individual motors 13 connected by the usual mechanical linkages to the movable windows 14 of the automobile for raising the windows to their closed positions. Each of the window motors 13a, 13b, 13c and 13d, in the automobile has four movable windows, may be of the direct current series type having an armature 15 and a pair of field or stator windings 16 and 17. The field windings of each window motor are selectively connectable in series with the armature winding by means of a switch 18 located adjacent the window and a switch 19 located at the dashboard or other suitable location adjacent the driver's seat. Each window is moved from its upper or closed position to its lower or open position whenever either its switch 18 or 19 is moved to the right to engage the stationary contact 20 or 21, respectively, and is moved to its raised or closed position whenever either the switch 18 or 19 is moved to the left to engage the stationary contact 22 or 23, respectively. Each of the window motors also usually includes an automatically reset overload release device or current breaker 23a, 23b, 23c or 23d connected in series with the armature winding which opens to disconnect the motor from the input circuit upon the occurrence of an overload on the motor, and then recloses automatically after a predetermined period of time.

The control circuit when rain or other precipitation begins to fall, first energizes the top motor to raise the top to its closed position and then energizes the window motors to close any windows which may be open. The control circuit includes a precipitation sensor device 25 securable to the automobile at any suitable exposed location thereof, for example, in the upwardly opening recess 26 between the body 27 of the automobile forwardly of the windshield 28 thereof, and the rear end 29 of the hood 30 of the automobile. The sensor device includes a pair of planar thin strips 32 and 33 of a conductive substance such as stainless steel, which are separated by a thin strip 34 of an insulating substance, such as is commercially obtainable under the name "Mylar."

The insulating strips 34 and 36 may be formed of a single piece of insulating substance, folded about the end edge 37 of the inner conductor strip 33, and are preferably wider and longer than the conductor strip 33 so that lower portions of the insulating strip extend below the conductor strip and end portions of the insulating strips extend outwardly of the end edge 38 of the inner conductor strip 33.

The insulating strips are adhesively secured to or bonded to the strips to form a fluid tight seal therewith and cover all outer end, side and bottom surfaces of the conductive strip 33 leaving only its top surface exposed. The lead or wire 39 extends into a suitable recess in the conductive strip and is soldered thereto. The lead extends outwardly between adjacent portions of the insulating strips which are adhesively secured or bonded thereto in fluid tight relationship thereto.

The upper edge surface of the conductor and insulator strips lie in a single plane and provide no recesses or cavities in which the rain or the precipitation may collect. The inner conductor strip has a pair of apertures 40 in which insulating washers 41 are disposed. The insulating washers also extend through the apertures 42 of the insulating strip which are concentrically aligned with the apertures 40 and have flanges 43 which extend into the apertures 45 of the conductive strip 32. The washers are also bonded or otherwise secured to the strip in fluid seal relationship so that no liquid can reach the inner conductive strip through the apertures in the strips.

The insulating strips 34 and 36 are extremely thin, for example, .005 inch thick, and the conductive strips are also quite thin, for example, .030 inch thick, so that the sensor device also is very thin and is easily installed in a very narrow upwardly opening recess or slot 26 with only its upper planar surface exposed. The outer insulating strip 36 and the outer conductor strip 32 have apertures 44 and 45 which are aligned with the central apertures 46 of the insulating washers 41, so that a suitable fastening means, such as the self tapping or sheet metal screw 48 may extend through the aligned apertures of the strips and the washers to secure the sensor device to the vehicle body, for example, to the vertical flange 50 of the automobile body with the screw 48 held out of contact with the inner conductive strip 33 by the washers 41 while the screw heads 52 thereof engage the outer conductive strip 32 and electrically connect or ground it to the vehicle body by the engagement of screw with the metal flange 50. The outer insulating strip is interposed between the flange 50 and the inner conductive strip 33 which is thus held out of electric contact or is electrically insulated from the body of the vehicle.

It will be apparent that when the sensor device 25 is installed in the upwardly opening recess 26, it is inconspicuous and unobtrusive since its exposed upper edge surfece is very narrow and thus the moisture sensing device does not detract from the appearance of the automobile. At the same time its location in such recess protects the sensor from damage and exposes its upper surface to precipitation, such as rain, sleet or snow. Drops or particles of such precipitation fall upon the top planar surface and establish a relative low resistance connection between the two conductive strips 32 and 33. The top surface of the sensor device is very narrow and flat and therefore can hold only a small amount of precipitation thereon so that upon the cessation of the precipitation, any such small amount of precipitation left on the top surface quickly evaporates or flows off the top surface. Such low resistance connection between the two conductive strips in therefore quickly broken or terminated very shortly after the cessation of the precipitation.

It will be noted that even if the recess is partially filled with water, only water on the top surface of the sensor device can provide a connection between the two conductive strips since the inner conductive strip is encased in a covering of moisture unpermeable insulating substance of the insulating strips.

The inner conductive strip 33 is connected by the lead 39 to the base 62 of a sensor transistor 63 whose emitter 64 and collector 65 circuit is connected in series across an input circuit 66, the emitter being connected to the positive side of the input circuit through the conductor 67, the emitter collector circuit of an ignition transistor 69, the conductor 70, the winding 71 of the sensor relay 72, the conductors 73 and 74, the stationary contact 75 and the movable contact or bimetallic strip 76 of a timer switch 77 and the conductor 78 and the collector 65 of the sensor transistor being connected to the other side of the input circuit through the conductor 79, ground and the conductor 80. The outer or grounded conductive strip 32 of the sensor device is connected to the input circuit through the conductors 81 and 82, ground and the conductor 79.

It will be apparent that the emitter collector circuit of the transistor 63 is rendered conductive when precipitation is present on the top planar surface of the sensor device establishing a low resistance connection between the conductive strips 32 and 33 if the emitter collector circuit fo the ignition switch transistor 69 is also in a conductive state, and current flows through the sensor relay winding 71. It will be apparent that the sensor transistor 63 is connected in an emitter follower circuit so that even if the resistance between the conductive strips 32 and 33 decreases to an abnormally low value, as for example, if conductive strips 32 and 33 were connected by metal, such as a coin placed thereon, while the emitter collector circuit of the sensor device is still connected across the input circuit 66, the current flow in the emitter base circuit and in the emitter collector circuit would be limited due to the resulting voltage drop across the winding 71. The capacitor 84 is connected across the emitter collector circuits of the sensor and ignition transistors by the conductor 85 which is connected to the conductor 70 and the conductor 86 which is connected to ground, to suppress inductive voltage transients and protect the transistors.

The base 90 of the ignition transistor 69 is connected to ground through the conductor 91, the resistance 92, the conductors 93 and 94, the resistance 95 and the conductor 96. The base 90 is also connectable through the ignition switch 98 of the automobile to the positive side of the input circuit 66 through the conductor 91, the resistance 92 and the conductors 93, 99 and 78. The base 90 of the ignition transistor 69 is therefore at the same potential as its emitter 104 and thus the emitter 104 collector 105 circuit is nonconductive when the ignition switch 98 is closed and prevents flow of current through the emitter collector circuit of the sensor transistor 63 and therefore through the sensor relay winding 71 even if the sensor device has precipitation thereon and provides a low resistance connection to ground for the base of the sensor transistor. The conductor 105a connected to the conductor 93 leads to the usual ignition system of the automobile, which may be of any impedance between zero or very low, and infinite or open circuit, without affecting operation of the circuit here.

When the ignition and sensor transistors are rendered conductive, i.e., when the ignition switch 98 is open, and the base 90 is not connected to the positive side of the input circuit but only to ground by the resistance 92 and 95, and precipitation on the top surface of the sensor device provides a relatively low resistance connection between the conductive plates 32 and 33, the contact 110 of the sensor relay 72 is moved to its lower closed position due to the energization of the relay winding 71 to connect the winding 111 of the top relay 112 across the input circuit 66 through the conductors 78, 113 and 114, the switch 115 which is in its upper position engaging its stationary contact 116 when the top is not in its upper raised or closed position, the conductors 118, 119, 81 and 82, ground and the conductor 79. The relay winding 111 when energized moves its normally open contact 120 to its closed position thus connecting the top motor 11 across the input circuit 66 through the conductors 78, 113, 122, 123 and 124, ground, and the conductor 79. The top motor drives the usual mechanism for raising the top and remains energized until the top moves to its raised or closed position whereupon the switch 115 is moved to its lower position out of engagement with its upper stationary contact disconnecting the winding 111 from across the input circuit and into engagement with its lower stationary contact 127. The winding 130 of a window relay 131 is energized, when the contact 110 of the sensor relay is in its closed position, by means of the conductor 78, the movable strip 76 and the stationary contact 75 of the timer switch 77, the the conductors 74, 73 and 138, the top switch 115, the conductor 118, the contact 110, the conductors 119, 81 and 82, ground and the conductor 79. The relay winding 130 remains energized as long as the timer switch remains in its closed position.

The window relay includes a plurality of normally open contact 134a, 134b, 134c and 134d for connecting the field windings 16a, 16b, 16c and 16d, respectively, of motors 13a, 13b, 13c and 13d, respectively, across the input circuit when the relay winding 130 is energized and the timer switch is closed. Each of the contacts 134 when closed connects the field winding 16 of its associated window motor to the positive side of the input circuit by means of the conductors 78, the timer switch, the conductors 74, 135, 136 and 137. The other side of each window motor is connected to the other side of the input circuit through the conductors 140, 81 and 82, ground and the conductor 79.

The timer switch 77 may be of the usual thermal bi-metallic type whose bi-metallic strip 76 has one end rigidly secured to a supporting structure and which is deformed out of contact with its stationary contact 75 when the bi-metallic strip is heated to a predetermined temperature by the passage of electric current therethrough. The bi-metallic strip has a hook 151 secured to its free or movable end which is engageable by any suitable latch 152 when the bi-metallic strip moves to its open position which holds the bi-metallic strip out of engagement with its stationary contact 75 even after the bi-metallic strip has cooled. The latch 152 may be of any suitable type, as for example, having a latch arm 153 pivoted at one end, as at 154, and a stop 155 which limits clockwise pivotal movement of the latch arm. It will be apparent that as the bi-metallic strip moves to the right (FIGURES 1 and 2) and out of engagement with the stationary contact 75, its hook 151 engages the lower free end of the latch arm 153 and pivots it in a counter-clockwise direction until it moves out of engagement with and past the lower end of the latch arm which then moves back to its position illustrated by gravity or by a suitable biasing means to the position where its clockwise movement is limited by the stop 155. As the bi-metallic strip cools and tends to move back to its original position, the engagement of its hook 151 with the latch arm 153 prevents it from moving back into its closed position in engagement with its stationary contact 75. The latch may have any suitable handle means by means of which it may be manually pivoted and moved out of engagement with the hook 151, as by again pivoting it in a counter-clockwise direction until it moves out of engagement with the hook 151 whereupon the resilient force of the bi-metallic strip causes it to move back to its closed position. The latch arm may also move in a counter-clockwise direction to reset the timer switch by a solenoid 157 whose armature may be operatively connected to the latch arm, in any suitable manner.

The solenoid is connected in series with a capacitor 160, one side of which is connected to the positive side of the input by means of the conductor 162, the winding 157 and the conductors 164 and 78 and its other side is connected to the other side of the input circuit by means of the conductor 165, and any one of the conductors 166 and 167 connected to an automobile door switch 168, ground and the conductor 79. The other side of the capacitor is also connected to the positive side of the input circuit through the conductor 165, the conductor 170, the lamps 171 and the conductors 172, 173 and 78. Thus, when all of the doors of the automobile are closed and all of the plurality of door switches are open, both sides of the capacitor are connected to the positive side of the input circuit. When any one of the plurality of the automobile doors is opened, its associated switch is closed connecting the other side of the capacitor to ground. The momentary surge or flow of current through the solenoid 157 due to the charging of the capacitor 160 causes the latch arm to be pivoted in a counter-clockwise direction to release the timer switch which moves to its closed position in the event that the timer switch has been latched in its open position by the latch 152. The latch then moves back to its original position. If the timer switch is in its closed position when an automobile door is opened, the latch arm is merely pivoted in a counter-clockwise direction and thus moves back to its original position. When the doors are again closed and all door switches are closed both sides of the capacitor are again connected to the positive side of the input circuit and the charge thereacross is thus discharged. The interval of time the timer switch 77 is connected across the input circuit and current flows therethrough to the window motors, the winding 130 of the window relay and the winding 71 of the sensor relay is of longer duration than the period of time necessary for any one of the window motors 13 to move its associated window, whose actuating mechanism is driven by such window motor, from its fully open to its closed position so that as long as the contact 110 is closed and the top switch 115 is in its lower position current is supplied to all of the window motors 13a, 13b, 13c and 13d, through the field windings 16 thereof, thus causing each motor to close any window which is in its open position. In the event that any one of the windows is in its closed position, the current merely flows through the motor which is stalled, but the duration of time necessary for the closure of any of the windows is so short that the motor is not damaged by such flow of current therethrough for such a short period of time, normally about four seconds, and its automatic reset circuit breaker 23 does not open before the timer switch moves to its open position.

In use, the control circuit 10 is de-activated whenever the ignition switch 98 of the automobile is in its closed position by the ignition transistor 69 whose emitter collector circuit is held in a non-conductive state, because no base current flows, since the base of the ignition transistor is then at the same potential as the emitter thereof. As a result, if the rain falls upon the top surface of the sensor device 25 and decreases the resistance across its conductive strips 32 and 33, the emitter collector circuit circuit of the sensor transistor 63 does not conduct current therethrough since it is connected in seres with the collector emitter circuit of the ignition transistor. The top, therefore, cannot be raised by the control circuit 10 when the automobile motor is running, it being apparent that this could be very dangerous if the autorent therethrough since it is connected in series with the top down and rain began to fall. Resistance 92 is of high value so that the base current flowing with the ignition switch open is insignificant to the automobile battery.

Assuming now that the top of the automobile is open, the ignition switch 98 is in its off or open position and rain or other precipitation begins to fall, and falls on the top surface of the sensor device, the collector and emitter circuits of the two transistors are both rendered conductive and the sensor relay winding 71 is energized moving its contact 110 to its closed position. Closure of the contact 110 now causes energization of the winding 111 of the top relay since the top switch 115 is now in its upper position. Energization of the relay winding 111 causes its contact 120 to move to its closed position and the top motor 11 is connected across the input circuit 66. The top motor, when energized, raises the top of the automobile to its closed position by means of the usual mechanical linkage therebetween. When the top moves to its closed position, it engages the top switch 115, which is operatively connected or associated therewith, and moves it from its upper position to its lower position. When the top switch moves to its lower position, the winding 130 of the window relay 131 is energized then being connected across the input circuit through the timer switch 77, the top switch 115 and the sensor relay 72. When the window relay winding 130 is energized, it moves its contacts 134 to their closed positions thus connecting each of the window motors 13 across the input circuit. Each window motor whose associated window is in a fully or partially open position closes such window to its fully closed position. The window motors whose windows are already in their closed positions are of course stalled with their armatures held against rotation. Current flows through the bi-metallic strip 76 of the timer switch 77 as long as any contact 134 is in its closed position, and, after a predetermined period of time sufficiently long to cause the window which takes the longest period of time to move from its fully open to its fully closed position, the heating of the bi-metallic strip by the current causes it to move out of engagement with its stationary contact 75. The bi-metallic strip then is latched in its open position by the latch 152. When the timer switch 77 moves to its open position the relay winding 130 is de-energized causing its contacts 134 to move to their open position. The window motors are also disconnected from the input circuit by the opening of the timer switch 77. Simultaneously the sensor relay winding 71 and the transistors are disconnected from the input circuit 66 so that once the top and windows are raised to their closed positions, no current flows through the control circuit even though the conductive strips of the sensor device are now connected by the precipitation on the top surface thereof.

Should the driver then enter or leave the car by opening one of the doors and thus closing the usual automobile door switch 168 the charging of the capacitor 160 causes the solenoid to move the latch arm 153 to release the bi-metallic strip for movement back to its closed position. If the precipitation has ceased and the precipitation previously on the top surface of the sensor device 25 has dried or flowed off the surface, the circuit is reset to its operative conditions ready to raise any windows which may thereafter be lowered by the driver. Should precipitation still be present on the sensor device, since the top is still in its raised position, the closure of the timer switch 77 will again energize the window motors 13 in the manner described for the predetermined period of time at the end of which the timer switch again moves to its open position and is latched therein by the latch 152. Alternatively, the driver may manually reset the latch 152 in any suitable manner as by manually moving the latch arm in a counter-clockwise direction to move it out of engagement with the hook 151 whereupon the bi-metallic strip moves back to its closed position in engagement with its stationary contact 75.

In the event that the top of the automobile is in raised position at the time that precipitation begins to fall, the top motor 111 is not energized, since the top switch 115 is now in its lower position so that the window motors are immediately energized and close the windows.

It will now be apparent that a new and improved control circuit 10 for causing windows and the top of a convertible automobile to be raised upon the occurrence of precipitation has been illustrated and described wherein the current flow through all operative elements of the circuit is arrested upon the completion of the cycle of operation of the control circuit and the completion of raising of the top and windows to their closed positions.

It will also be seen that a control circuit includes a precipitation sensor device 25, a timer switch 77 connected in series with the window motors which disconnects the window motors and the sensor device from the source of current whenever the windows have been moved to their fully closed position. It will further be seen that the timer switch is provided with latch means for holding it in open position once it has moved to its open position and that such latch means may be manually released to reset the timer switch or the control circuit may include automatic reset means such as the solenoid 157 and the capacitor 160 for releasing the latch 152 and permitting the timer switch to move to its closed position whenever any one of the doors of the automobile is opened so that the control device is placed in its operative position whenever a driver enters or leaves an automobile and insures that the control device is placed in operative condition even should the driver inadvertently forget to manually reset the timer switch.

It will further be seen that the control circuit is easily adapted for use with an automobile having a fixed top in which event the top switch, the top relay and the ignition transistor are omitted, one side of the relay winding 130 being connected directly to the contact 110 of the sensor relay and the emitter collector circuit of the sensor transistor being directly connected to one side of the winding 71 of the sensor relay 72.

It will further be seen that the interval of time during which the window motors must remain energized to close any one of the windows of the automobile is considerably shorter than the period of time during which current must flow through a stalled window motor to cause its automatic reset circuit breaker 23a, 23b, 23c or 23d to open so that the timer switch 77 is set to open after current flows therethrough for a period of time which is longer than a period of time necessary to cause all windows to be moved from their fully open to their fully closed positions, but shorter than the period of time required for any one of the automatically reset circuits breakers 23 of the window motors 13 to move to its open position.

It will further be seen that the control circuit 10 and the sensor device may be easily installed in an automobile and connected to the usual motors which actuate the top raising and window raising mechanical linkages or means with a minimum of modification required to the automobile, the transistors and relays being disposed in suitable housing mounted in the automobile at a location where the normal means for moving the latch arm 153 of the latch means 152 is accessible to the driver of the automobile.

It will further be seen that only one wire needs to be attached to the circuit of each of the window motors if the motor is of the series type. It will be apparent to those skilled in the art that two wires would have to be attached to the circuit of each window motor if it were of the shunt field winding type.

It will further be seen that the capacitor 160 may be so connected that it is discharged during the time the doors are closed and is charged to cause momentary energization of the solenoid 157 when the door is opened. In this case, one side of the solenoid is connected to ground by the conductor 164 instead of the conductor 78 and the capacitor will be discharged through the lamps 171 when the door switches are open and will charge when any one of the doors switches closes, thus actuating the solenoid.

It will further be seen that the provision of the sensor transistor 63 between the sensor device 25 and the sensor relay winding 71 provides great sensitivity since even a single drop of moisture on the top surface of a sensor device, which provides a relatively high resistance connection between the conductive strip, for example, 60,000 ohms, causes the sensor relay to operate. If desired, the sensor transistor may be omitted and the sensor device connected directly in series with the sensor relay winding 71 in which case the area of contact of the rain must be considerable in order that the resistance of the sensor device be quite low. This may be accomplished by placing the top surface of the inner insulating strip below the top surfaces of the conductive strips so that the rain will fill the channel thus formed and contact substantial areas of the conductive strip.

In the event that the automatic reset protective device or circuit breaker 23 of each window motor were of such type that it would open within a period of time after the window motor is stalled which is shorter than that required for the movement of the windows from their fully open to their fully closed positions and if any one of the automobile windows were closed at the time precipitation began, such circuit breaker would open before the timer switch would open and would then open and close periodically while the timer switch remains closed thus periodically decreasing the flow of current through the timer switch 77. Such periodic decrease in the amount of current flowing through the timer switch could cause it to remain in its closed position for a prolonged or indefinite period of time since the timer switch opens only when a current in excess of the predetermined value flows through the timer switch for a predetermined period of time. In the event that the automobile is provided with window motors having automatically reset circuit breakers which have such short time periods, the control circuit 10a may be employed.

The control circuit 10a is shown in use on an automobile having a fixed top and is similar to the control circuit 10. Accordingly, elements of the circuit 10a have been provided with the same reference characters, to which the subscript "a" has been added, as the corresponding element of the control circuit 10a. The emitter collector circuit of the sensor transistor 63a is connected in series with the winding 71a of the sensor relay 72a across the input circuit 66a by means of the conductor 183, the timer switches 77a–77d, each of which is connected in series with a diode 182a–182d, respectively, between the conductor 183 connected to the positive side of the input circuit and one side of the sensor relay winding by means of the conductors 184a–184d, 186a–186d and 187a–187d, respectively, the conductors 188, 189 and 190, ground and the conductor 191. The timer switches 77a–77d connect the window motors 13a–13d, respectively, across the input circuit by means of the conductor 183, the conductors 184a–184d, the stationary contacts 192 and bimetallic strips 193 of the timer switches, the conductors 185a–185d, the contacts 195a–195d of the window relay 131a, the conductors 196a–196d, the conductors 197a–197d, the field windings 16, the armatures 15 and the automatic reset circuit breakers 23 of the motors 13a–13d, the conductors 198a–198d, respectively, the conductors 199 and 200, ground and the conductor 191.

The window relay winding 130a is connected across the input circuit by each of the timer switches, 77a–77d, when they are in closed positions and the sensor relay winding 71a is energized, by means of the diodes 182a–182d, which are connected in series with the timer switches 77a–77d, respectively, and the window relay winding 130 by the conductors 185a–185d, 186a–186d, and 187a–187d, respectively, the conductors 188 and 202, the contact 110a of the sensor relay 72a, the conductors 203, 199 and 200, ground and the conductor 191. The timer switches 77a–77d may be structurally identical to the timer switch 77 and have identical latch means 152a–152d for holding them in open positions.

In use, assuming that all four windows are open, all four timer switches 77 are in their closed positions, and precipitations falls on the top planar surface of the sensor device 25 establishing a relatively low resistance connection or path between its conductive strips 32 and 33, the emitter collector circuit of the sensor relay 63a is rendered conductive and the sensor relay winding 71a is connected across the input circuit through each of the closed switches and its serially connected diode. The energization of the relay winding 71a immediately connects the window relay winding 130a across the input circuit through each of the closed switches and its diode and the relay contacts 195a–195d are moved to their closed positions. Each of the window motors is thus energized and moves its associated window through a suitable mechanical linkage to its closed position. Each window reaches its closed position before the period of time in which its associated timer switch opens which period of time is somewhat shorter than the period of time necessary to cause the automatic circuit breaker 23 of the window motor to open.

In the event that one of the windows, for example, the window which is closed by the motor 13a is in its closed position at the time precipitation begins to fall, its motor 13a is of course stalled at the time the contact 195a is closed and through the timer switch 77a causes the timer switch to open in a shorter interval of time than if the window were not in its fully closed position so that the timer switch 77a opens before the protective device 23a of the motor 13a opens. Once the switch 77a opens, the motor 13a is de-energized since the diode 182d prevents reverse flow from the conductor 188 to the conductor 185a even though the contact 195a is of course still in its closed position. Each of the other three timer switches 77b–77d however remains in its closed position until its window is fully closed. The window relay winding 130a remains energized through at least one diode until the last timer switch 77 opens at which time the relay winding 130a and the sensor relay winding are disconnected from the input circuit.

It will now be seen that a circuit 10a functions in substantially the same manner as the circuit 10 except that the operation of each of the window motors is controlled by its own individual timer switch so that as any one of the timer switches opens it de-energizes its motor while the other window motor may still be energized.

It will also be apparent that while a timer switch 77 is of a usual thermal bi-metallic type having a latch means 152 which releasably holds the bi-metallic strip 76 in its open position has been illustrated and described, any suitable timer switch may be employed which opens when current flow excess of a predetermined valve flows therethrough for a predetermined period of time and which must be reset to its closed position by actuation of its latch means.

Figure 8:
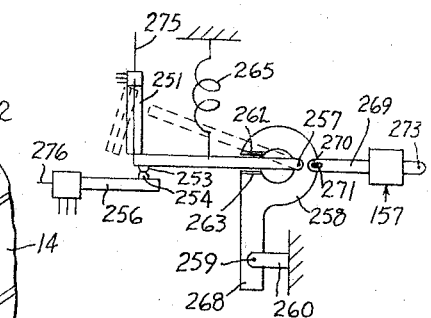
Figure 6:
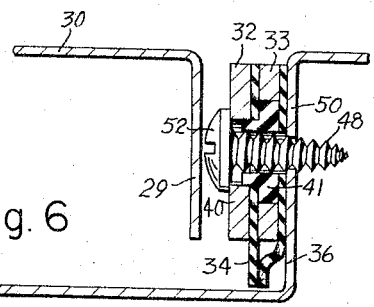
FIGURE 6 is a vertical sectional view of the moisture detecting device installed on the automobile illustrated in FIGURE 5.
Figure 7:
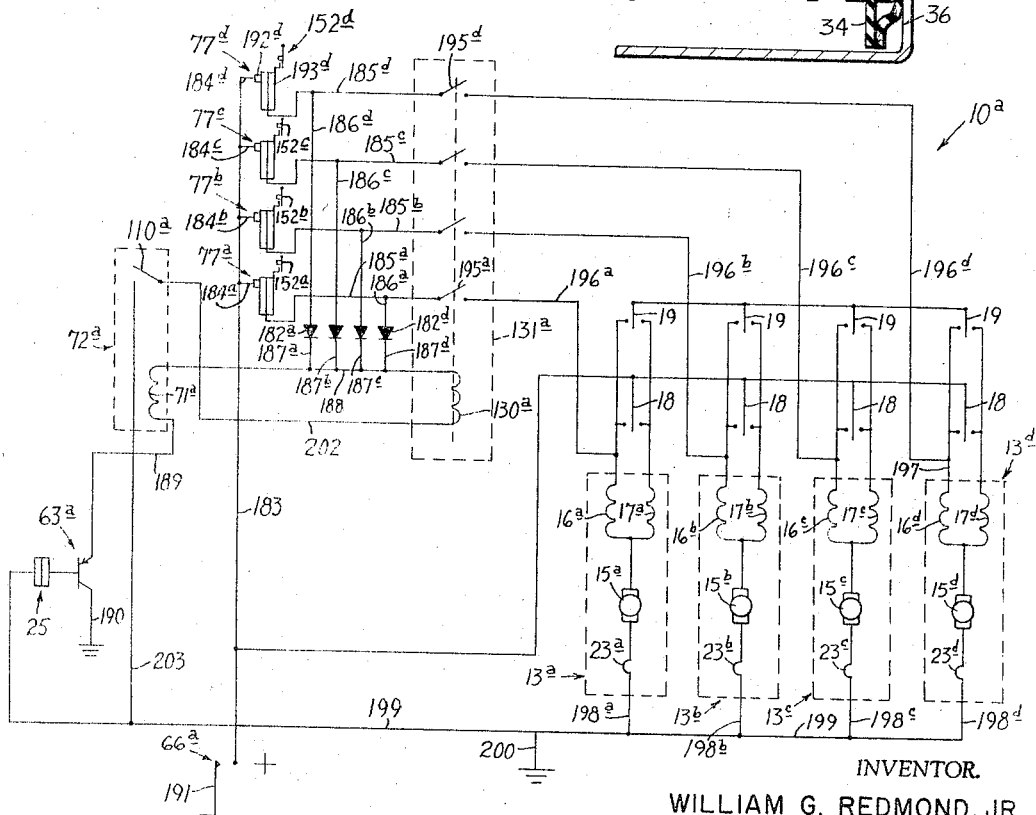
FIGURE 7 is a schematic illustration of a modified form of the control circuit embodying the invention for raising the windows of the automobile; and, FIGURE 8 is a schematic view of a modified form of a timer switch and manual reset mechanism.

For example, the timer switch 250 illustrated in FIGURE 8 may be employed in place of the timer switches 77 of the control circuits 10 and 10a. The timer switch 250 includes a bi-metallic strip 251 one of whose ends is rigidly secured to a fixed structure and whose other end is engageable with a contact latch arm 252 to hold its contact 253 in engagement with the contact 254 on one end of a resilient contact arm 256 whose other end is rigidly secured to a fixed structure. One end of the contact latch arm is pivotally secured, as at 257, to a latch lever 258 which is pivotally secured intermediate its ends, as at 259, to a bracket 260 rigidly secured to a fixed structure.

The latch lever has lateral lugs 261 and 263 which are engageable with opposite sides of the contact latch arm to limit the degree of pivotal movement of the latch arm. The latch arm is biased for clockwise pivotal movement about its pivot 257 by a spring 265. One end of the spring is secured to the contact latch arm as at 266 and its other is secured to a fixed structure.

The latch lever may be moved about its pivot 259 by means of its handle end 268. In addition, the plunger 269 of the solenoid 157 may be pivotally secured to the latch lever, as by the pin 276 which extends through a suitable slot 271 in the end of the armature. The solenoid may be pivotally secured to a fixed structure as at 273.

When the timer switch is closed, the bi-metallic strip 251 is in the full line position illustrated in FIGURE 8 holding the contact latch arm in its lower position wherein the contacts 253 and 254 are in engagement and current may flow through the switch between the conductors 275 and 276. When the bi-metallic strip is heated to a certain temperature by the flow of current therethrough, its free end moves to the left and out of engagement with the control latch arm which is then pivoted upwardly by the spring to the broken line position. When the bi-metallic strip now cools and moves back to its full line position, it cannot again engage the contact latch arm.

The timer switch may, of course, be opened by energization of the solenoid 157 which causes clockwise pivotal movement of the latch lever about its pivot 259 or by manually pivoting the latch lever in this direction. Such clockwise pivotal movement of the latch lever moves the contact latch arm to the right and out of engagement with the bi-metallic strip, whereupon the spring moves it to its upper broken line position.

The timer switch is reset by pivoting the latch lever in a counter-clockwise direction about its pivot 259 and the engagement of its lug 26 with the contact latch arm during such movement now causes the contact latch arm to again move to the full line position illustrated in FIGURE 8, the free end of the contact latch arm bending the bi-metallic strip as it engages it and moves therepast until the free end of contact latch arm moves below the bi-metallic strip which then moves back resiliently to its full line position to again hold the contacts 253 and 254 in engagement.

It will be seen now that both the timer switches 77 and 250 have latch means for releasably holding the timer switch in open position.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A control circuit for an automobile having plurality of windows movable between open and closed positions by individual window moving means, each of said moving means comprising an electric motor, said control circuit including: a sensor relay; first means including a precipitation sensor device for energizing said sensor relay upon the occurrence of precipitation; and second means including a thermal timer switch responsive to the energization of said sensor relay for simultaneously energizing the electric motors of the window moving means, said timer switch moving to open position after the windows of automobile have been moved to their closed position to de-energize said sensor relay and said first and second means said timer switch including latch means operable when said timer switch moves to open position for releasably holding said timer switch in open position.

2. The control circuit of claim 1 wherein said means for energizing said sensor relay includes a transistor for amplifying variations in the resistance of said sensor device.

3. The control circuit of claim 1 wherein said means responsive to the energization of said sensor relay includes a window relay having a winding connected in series with said timer switch, said window relay when energized connecting said timer switch and the electric motors of the electric moving means across a source of current.

4. A control circuit for an automobile having a closure movable between open and closed positions by closure moving means, said moving means comprising an electric motor, said control circuit including: a precipitation sensor device mountable on the automobile whose resistance decreases upon the occurrence of precipitation; control means operatively associated with said sensor device and energizable when the resistance of said sensor device decreases; means including a thermal timer switch responsive to the energization of said control means for energizing the electric motor of the closure moving means, said timer switch moving to open position after the closure of the automobile has been moved to its closed position to de-energize said control means, said sensor device and said means including said timer switch, said timer switch including latch means operable when said timer switch moves to open position for releasably holding said timer switch in open position.

5. A control circuit for an automobile having plurality of windows movable between open and closed positions by individual window moving means, each of said moving means comprising an electric motor, said control circuit including: an input circuit; a sensor device exposed to the atmosphere whose resistance decreases upon the occurrence of precipitation; a sensor relay having a winding; a transistor having an emitter collector circuit connected in series with said sensor relay winding and having its emitter base circuit connected in series with said sensor device; a thermal timer switch; and a window relay having a winding connectable in series with said timer switch across said input circuit by said sensor relay when said sensor relay winding is energized, said timer switch when in closed position connecting said window relay winding across said input circuit, said window relay when its winding is energized connecting the window motors in series with said timer switch across said input circuit, said timer switch opening after all of the windows have been raised to their closed positions to disconnect said sensor device, said sensor relay and window relay windings and said window motors from said input circuit, said timer switch having latch means operable when said timer switch opens for releasably holding said timer switch in open position.

6. A control circuit for an automobile having plurality of windows movable between open and closed positions by individual window moving means, each of said moving means comprising an electric motor, said automobile having a door and a switch associated with the door and closable when the door is opened, said control circuit including: an input circuit; a sensor device exposed to the atmosphere whose resistance decreases upon the occurrence of precipitation; a sensor relay having a winding; a transistor having an emitter collector circuit connected in series with said sensor relay winding and having its emitter base circuit connected in series with said sensor device; a thermal timer switch; and a window relay having a winding connectable in series with said timer switch across said input circuit by said sensor relay when said sensor relay winding is energized, said timer switch when in closed position connecting said base emitter and emitter collector circuits of said transistor across said input circuit, said window relay when its winding is energized connecting the window motors in series with said timer switch across said input circuit, said timer switch opening after all of the windows have been raised to their closed positions to disconnect said sensor device, said sensor relay and window relay windings and said window motors from said input circuit said timer switch having latch means operable when said timer switch moves to open position for releasably holding said timer switch in open position; and means operable by a door switch for actuating said latch means to release said timer switch for movement to its closed position upon the opening of a door of the automobile.

7. The control device of claim 1, wherein said sensor device includes a pair of planar conductive strips and an inner insulating strip disposed between said conductive strips, said strips having top edge surfaces disposed substantially horizontally whereby precipitation falling on said top edge surfaces provides a low resistance connection between said conductive strips over the top edge surface of said insulating strip.

8. A control circuit for a convertible automobile having an ignition switch, a top movable between a raised closed position and a retracted open position by a moving means, a plurality of windows movable between open and closed positions by individual moving means, each of said moving means comprising an electrically energizable prime mover, and a switch operatively associated with a door of the automobile and closable when the door is opened, said control circuit including: an input circuit; a sensor device securable to the automobile in a position exposed to the atmosphere and whose resistance decreases upon the occurrence of precipitation; a sensor relay having a winding; an ignition switch transistor and a sensor transistor having emitter collector circuits connected in series with said sensor relay winding, said ignition transistor having its base emitter circuit connected in series with said ignition switch and said sensor transistor having its base emitter circuit connected in series with said sensor device; a top switch which is in a first operative position when top is in its retracted position and in a second operative position when the top is in its raised position; a top relay for connecting the top prime mover across said input circuit having a winding connected across said input circuit by said sensor relay and said top switch when said top switch is in said first operative position and said sensor relay winding is energized; a thermal timer switch, said sensor relay winding and the emitter collector circuits of said transistors being connected across said input circuit by said timer switch when said timer switch is in closed position, the base emitter circuit of said ignition transistor being connected to said input circuit when said timer switch and the ignition switch of the automobile are in closed position to prevent conduction by the emitter collector circuits of said transistors, said base emitter circuit of the sensor transistor being connected across said input circuit by said sensor device and said timer switch when said timer switch is closed; a window relay having winding connected across said input circuit by said sensor relay and said timer switch when said top switch is in said second operative position and said timer switch is closed, said window relay when its winding is energized simultaneously connecting the window prime movers across said input circuit to cause said windows to be moved to closed position, said timer switch opening after the windows have been moved to their closed positions, said timer switch having latch means operable when said timer switch moves to open position for releasably holding the timer switch in open position; and means operatively associated with a switch of the automobile closable when an automobile door is opened for causing said latch means to release said timer switch for movement to its closed position.

9. A control circuit for a convertible automobile having an ignition switch, a top movable between a raised closed position and a retracted open position by a moving means, a plurality of windows movable between open and closed position by individual moving means, each of said moving means comprising an electrically energizable prime mover, said control circuit including: an input circuit; a sensor device securable to the automobile in a position exposed to the atmosphere whose resistance decreases on the occurrence of precipitation; a sensor relay having a winding; an ignition switch transistor and a sensor transistor having emitter collector circuits connected in series with said sensor relay winding, said ignition transistor having its base emitter circuit connected in series with said ignition switch and said sensor transistor having its base emitter circuit connected in series with said sensor device; a top switch which is in a first operative position when the top is in its retracted position and a second operative position when the top is in its closed position; a top relay for connecting the top prime mover across said input circuit having a winding connected across said input circuit by said sensor relay and said top switch when said top switch is in said first operative position; a thermal timer switch, said sensor relay winding and said emitter collector circuits being connected across said input circuit by said timer switch when said timer switch is in closed position, the base emitter circuit of said ignition transistor being connected to said input circuit when said timer switch and the ignition switch of the automobile are in closed position to prevent conduction in the emitter collector circuits of the transistors, the base emitter circuit of the sensor transistor being connected across said input circuit by said sensor device and said timer switch when said timer switch is closed; and a window relay having a winding connected across said input circuit by said sensor relay and said timer switch when said top switch is in said second operative position and said timer switch is closed, said window relay when its winding is energized simultaneously connecting the window prime movers across said input circuit, said timer switch opening after the windows have been moved to their closed positions.

10. A control circuit for a convertible automobile having an ignition switch, a top movable between a raised top position and a retracted open position by an electrically energizable prime mover, said control circuit including: an input circuit; a sensor device securable to the automobile in a position exposed to the atmosphere whose resistance decreases upon the occurrence of precipitation; a sensor relay having winding; an ignition switch transistor and a sensor transistor having emitter collector circuits connected in series with said sensor relay winding, said ignition transistor having its base emitter circuit connected in series with said ignition switch, said sensor transistor having its base emitter connected in series with said sensor device; a top switch which is in a first operative position when the top is in its retracted position and in a second operative position when the top is in its raised top position; a top relay for connecting a top prime mover across said input circuit having a winding connected across said input circuit by said sensor relay and said top switch when said top switch is in said first operative position and said sensor relay winding is energized; a thermal timer switch; said sensor relay winding and said emitter collector circuits being connected across said input circuit by said timer switch when said timer switch is in closed position, the base emitter circuit of said ignition circuit transistor being connected to said input circuit when said timer switch and the ignition switch of the automobile are in closed position to prevent conduction by the emitter collector circuits of the transistors, the base emitter circuit of the sensor transistor being connected across said input circuit by said sensor device and said timer switch when said timer switch is closed.

11. A control circuit for an automobile having a plurality of windows movable between open and closed positions by individual window moving means, each of said moving means comprising an electric motor, said control circuit including: an input circuit; a sensor device exposed to the atmosphere whose resistance decreases upon the occurrence of precipitation; a sensor relay having a winding; a transistor having an emitter collector circuit and an emitter base circuit connected in series with said sensor relay winding; a thermal timer switch for each of said electric motors; a diode operatively associated with each of said timer switches; and a window relay having a winding connectable in series with each of said timer switches and its associated diode, across said input circuit by said sensor relay when said sensor relay winding is energized, each of said timer switches when in closed position and its associated diode being connected in series with said window relay winding and said base emitter and emitter collector circuits of said transistor across said input circuit, said window relay when its winding is energized connecting each window motor in series with its associated timer switch across said input circuit, each of said timer switches opening after the window movable by the motor whose energization is controllable by the associated timer switch has been raised to its closed position to disconnect its associated window motor from said input circuit, said relay windings and said base emitter and emitter collector circuits being disconnected from said input circuit when all of said timer switches are open, each of said timer switches having latch means for releasably holding it in open position.

12. A sensor device including a pair of parallel planar conductive strips secured to one another; and insulating means disposed about one of said conductive strips in fluid seal relation thereto, said one of said strips having only a top edge surface exposed whereby precipitation falling on a top edge surface of said sensor device provides a low resistance connection between said conductive strips.

References Cited by the Examiner

UNITED STATES PATENTS

| | | | |
|---|---|---|---|
| 2,640,958 | 6/1953 | Davis | 318—483 X |
| 2,788,482 | 4/1957 | Ray | 318—471 X |
| 2,802,694 | 8/1957 | Murray | 318—483 X |
| 2,901,642 | 8/1959 | Smith et al. | 307—141 X |
| 2,994,525 | 8/1961 | Onksen et al. | 318—483 X |
| 3,214,613 | 10/1965 | Kennedy | 307—141.4 |

ORIS L. RADER, *Primary Examiner.*

JOHN F. COUCH, *Examiner.*

J. C. BERENZWEIG, *Assistant Examiner.*

UNITED STATES PATENT OFFICE
CERTIFICATE OF CORRECTION

Patent No. 3,307,095                         February 28, 1967

William G. Redmond, Jr.

It is hereby certified that error appears in the above numbered patent requiring correction and that the said Letters Patent should read as corrected below.

Column 15, line 20, beginning with "12. A sensor device" strike out all to and including "tive strips." in line 6, column 16, and insert instead the following claim:

12. A control circuit of the character set forth in claim 1 and for an automobile having a convertible top, and including: means for moving said top between raised and lowered retracted position; and control means responsive to said sensor relay for energizing the top moving means for moving said top from retracted position to raised position.

Signed and sealed this 18th day of February 1969.

(SEAL)
Attest:

EDWARD M. FLETCHER, JR.
Attesting Officer

EDWARD J. BRENNER
Commissioner of Patents